United States Patent
Persson et al.

(10) Patent No.: US 9,634,876 B2
(45) Date of Patent: Apr. 25, 2017

(54) PHASE REFERENCE SYMBOL FORMAT FOR OFDM PHASE SYNCHRONIZATION

(71) Applicant: Telefonaktiebolaget L M Ericsson (publ), Stockholm (SE)

(72) Inventors: Anders Persson, Kode (SE); Henrik Sahlin, Molnlycke (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/769,816

(22) PCT Filed: Mar. 28, 2013

(86) PCT No.: PCT/EP2013/056754
§ 371 (c)(1),
(2) Date: Aug. 23, 2015

(87) PCT Pub. No.: WO2014/154294
PCT Pub. Date: Oct. 2, 2014

(65) Prior Publication Data
US 2016/0006594 A1     Jan. 7, 2016

(51) Int. Cl.
*H04L 27/26* (2006.01)
*H04L 27/20* (2006.01)
*H04L 5/00* (2006.01)

(52) U.S. Cl.
CPC ........ *H04L 27/2613* (2013.01); *H04L 5/0044* (2013.01); *H04L 5/0091* (2013.01); *H04L 27/2092* (2013.01)

(58) Field of Classification Search
CPC   H04L 27/2092; H04L 27/2613; H04L 5/0044
See application file for complete search history.

(56) References Cited

U.S. PATENT DOCUMENTS

2011/0255501 A1* 10/2011 Kwon ................... H04L 5/0051
                                                                370/329
2011/0305185 A1* 12/2011 Kwon ................... H04L 5/0007
                                                                370/312

FOREIGN PATENT DOCUMENTS

EP          2271010 A1     1/2011
WO     2010/087665 A2     8/2010
(Continued)

OTHER PUBLICATIONS

S Muruganathan et al., Null Sub-Carrier Aided Reference Symbol Mapping for Improved Channel Estimation in 3GPP LTE Downlink, 2010 IEEE Vehicular Technology Conference (VTC 2010-Spring) May 16-19, 2010, Taipei, Taiwan, pp. 1-5.

(Continued)

*Primary Examiner* — Ross Varndell
(74) *Attorney, Agent, or Firm* — Leffler Intellectual Property Law, PLLC

(57) ABSTRACT

The present invention describes an orthogonal frequency-division multiplexing, OFDM, transmitter and a method for embedding phase reference symbols into an OFDM symbol. The invention comprises a single-carrier pre-processing unit arranged to receive phase reference symbols and provide pre-processed phase reference samples as output and an OFDM modulator arranged to receive data symbols and the pre-processed phase reference samples as input and map the data symbols to sub-carriers and embed the single-carrier samples into a frequency sub-band of the OFDM symbol. While the invention particularly relates to an OFDM communication system, it should be noted that it could be applicable to any type of multicarrier communication system.

13 Claims, 11 Drawing Sheets

(56) References Cited

FOREIGN PATENT DOCUMENTS

WO     2012/077753 A1     6/2012
WO     2013/021187 A1     2/2013

OTHER PUBLICATIONS

V Syrjala et al., Phase Noise Modelling and Mitigation Techniques in OFDM Communications Systems, in Proc. IEEE WTS 09, pp. 1-7, Apr. 2009.

Written Opinion (PCT/ISA/237) mailed May 10, 2013, by the European Patent Office for International Application No. PCT/EP2013/056754 (all pages).

International Search Report (PCT/ISA/210) mailed May 10, 2013, by the European Patent Office for International Application No. PCT/EP2013/056754 (all pages).

\* cited by examiner

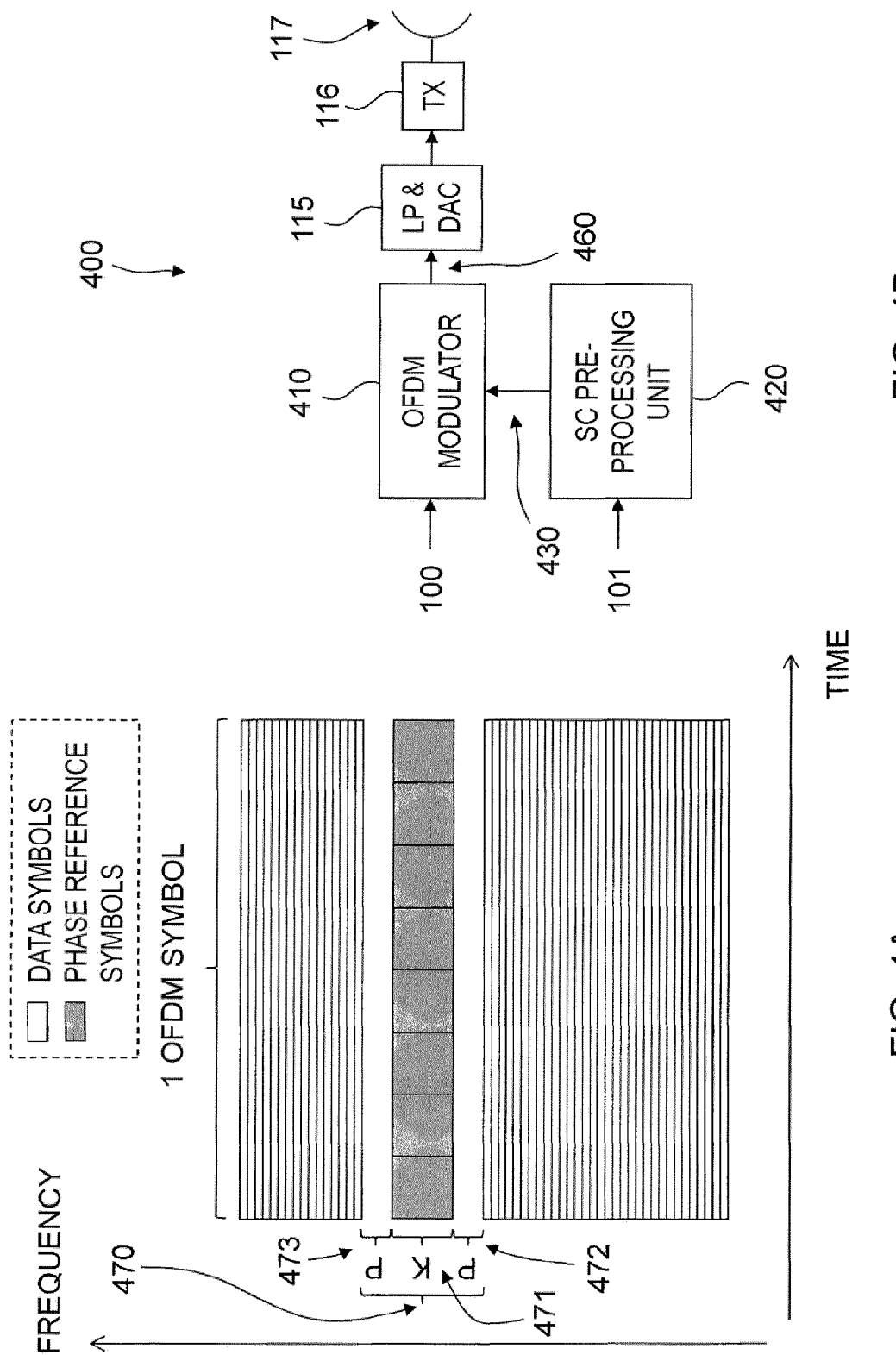

PHASE REFERENCE SYMBOL FORMAT FOR OFDM PHASE SYNCHRONIZATION

TECHNICAL FIELD

The present invention relates to a phase reference symbol format used for phase synchronization in a multi-carrier communication system.

BACKGROUND

OFDM is a powerful modulation format over frequency-selective radio channels. Low complexity equalization, robustness for frequency selective channels, and the ability to use different data modulations on different sub-carriers are the main advantages of OFDM. OFDM systems are, however, also known to be sensitive to phase-noise; a radio-hardware imperfection that causes the OFDM sub-carriers to become non-orthogonal. Due to the resulting inter-sub-carrier interference, ICI, the demodulator signal-to-noise plus interference ratio, SINR, is reduced. If the phase noise process can be estimated, its negative effect on receiver performance can partly be compensated for by digital signal processing at the receiver.

In principle, phase noise estimation is performed at the receiver by observing the change in carrier-phase between the received symbols and a sequence of known phase reference symbols. Various phase estimation techniques exist which can be divided into two main categories. On the one hand, there are reference symbol-based estimators where reference symbols are known a-priori, and on the other hand, decision feedback estimators where tentative decisions on data symbols are made and used as reference symbols in an iterative fashion. It is also possible to combine reference symbol-based and decision feedback based estimators.

In single-carrier schemes it is often a relatively easy task to estimate and compensate for phase noise, as the phase noise process typically is narrowband compared to the modulation bandwidth. In other words, the change in phase from one known reference symbol to the next is typically small enough to be accurately estimated and compensated for. The situation is, however, different in OFDM systems. An OFDM system with N sub-carriers has an N-fold increase in symbol time, compared to a single-carrier system with the same modulation symbol rate[1]. This can be seen in FIGS. 3A and 3B, where time-frequency diagrams of an OFDM and a single-carrier scheme are illustrated. As N often is a relatively large number there can be a significant change in the phase noise process during one OFDM symbol. As a consequence, to reach acceptable receiver performance it will be necessary to compensate not only for the average phase over each OFDM symbol but also for phase fluctuations during each OFDM symbol.

[1] For simplicity we omit the cyclic-prefix here as it typically is short compared to the total OFDM symbol time.

FIGS. 1-2 show schematic block diagrams of a conventional OFDM transmitter and receiver arranged for phase noise estimation and compensation. Key components in the OFDM transmitter and receiver are the inverse discrete Fourier transform, IDFT, and the discrete Fourier transform, DFT. The transmitter, shown in FIG. 1, has data symbols and phase reference symbols as input. The inputs are fed to an OFDM modulator, comprising a serial-to-parallel, S/P, converter for parallelizing the input symbols, an N-point IDFT for mapping N input symbols to N sub-carriers and outputting N time-domain samples, a parallel-to-serial, P/S, converter for serializing the time-domain samples and an insert prefix unit for inserting a cyclic prefix before transmission of the OFDM symbol. The OFDM modulator output is low-pass filtered and converted to continuous time in an LP & DAC unit and passed on to a TX block connected to an antenna for transmission. The TX block comprises radio-hardware, including circuitry for up-converting the baseband signal to a radio frequency, RF, signal. FIG. 2 shows the conventional OFDM receiver arranged for phase estimation and compensation. An RF signal is received at an antenna connected to an RX block. The RX block comprises radio-hardware, including circuitry for down-converting the received RF signal to baseband. The received signal is converted to discrete-time and low-pass filtered in an LP & ADC unit. The discrete-time received signal is input to a phase estimation unit, which computes phase compensation estimates by comparing the received signal with known phase references. The phase compensation estimates are used to compensate the discrete-time received signal before a conventional OFDM demodulator demodulates the phase compensated signal. The OFDM demodulator, comprises a remove prefix unit for removing the time-domain cyclic prefix, a parallel-to-serial, P/S, converter for parallelizing the received time-domain samples, and an N-point DFT configured to obtain the received data symbols.

In the OFDM literature, most phase compensation schemes are targeting estimators and compensation algorithms for standardized OFDM systems, such as IEEE 802.11 and 3GPP LTE. Very few, if any, are targeting the design of reference signals for phase noise estimation in applications where phase noise is the limiting factor. Reference R1 provides an overview of state-of-the-art phase noise estimation and mitigation techniques. The most basic techniques are based on common phase error, CPE, estimation and compensation for all sub-carriers. However, CPE-based compensation algorithms have the same effect on all sub-carriers inside one OFDM symbol and will therefore not mitigate ICI. More advanced ICI reduction techniques range from fairly simple interpolation between consecutive CPE-estimates to more advanced MMSE estimators or iterative methods.

However, the above methods do not provide sufficient ICI mitigation in OFDM systems operating under severe phase noise. For example, OFDM has previously not been suitable for applications such as microwave radio backhaul where phase noise is often the most performance-limiting factor. Hence, there is a need to design a phase reference symbol format to be used for phase synchronization in OFDM systems where phase noise is the limiting factor.

[R1] V. Syrjälä, M. Valkama, N. Tchamov, and J. Rinne, "Phase Noise Modelling and Mitigation Techniques in OFDM Communications Systems", in Proc. IEEE WTS 09, pp. 1-7, April 2009.

SUMMARY

It is an object of the present invention to remedy, or at least alleviate, some of these drawbacks for OFDM systems operating under severe phase noise. This is provided in a number of aspects of the present invention described below.

In a first aspect the invention describes an OFDM transmitter arranged to embed single-carrier phase reference symbols into an OFDM symbol, wherein the OFDM transmitter comprises a single-carrier pre-processing unit arranged to receive phase reference symbols as input and provide pre-processed phase reference samples as output. The OFDM transmitter further comprises an OFDM modulator arranged to receive data symbols and the pre-processed phase reference samples as input and map the data symbols to sub-carriers and embed the single-carrier samples into a frequency sub-band of the OFDM symbol.

The pre-processed phase reference samples may be frequency-domain pre-processed phase reference samples in which case the single-carrier pre-processing unit comprises a K-point discrete Fourier transformation (DFT) unit arranged to receive K phase reference symbols as input and provide K DFT-precoded frequency domain samples as output, and an insert prefix postfix unit arranged to insert P prefix and P postfix samples to the DFT-precoded frequency domain samples to obtain the frequency-domain pre-processed phase reference samples. Furthermore, in the case that the pre-processed phase reference samples are frequency-domain pre-processed phase reference samples, the OFDM modulator comprises an N-point inverse discrete Fourier transformation (IDFT) unit arranged to receive the data symbols and the frequency-domain pre-processed phase reference samples as input, and map the data symbols onto sub-carriers and the frequency domain pre-processed phase reference samples onto a single-carrier signal by inputting the frequency-domain pre-processed phase reference samples to K+2P adjacent inputs of an N-point IDFT unit to obtain an OFDM symbol with embedded single-carrier phase reference symbols from the N-point IDFT output.

Alternatively, the pre-processed phase reference samples may be time-domain pre-processed phase reference samples in which case the single-carrier pre-processing unit comprises a single-carrier modulator arranged to receive K phase reference symbols as input and provide time-domain pre-processed phase reference samples as output.

Furthermore, in the case that the pre-processed phase reference samples time-domain pre-processed phase reference samples, the OFDM modulator comprises an N-point IDFT arranged to receive data symbols as input, map the data symbols onto sub-carriers and allocate a phase reference frequency sub-band by inputting 0 to K+2P adjacent inputs of the N-point IDFT to obtain time-domain OFDM samples from the N-point IDFT output, and an adder arranged to add the time domain OFDM samples and the time-domain pre-processed phase reference samples to obtain an OFDM symbol with embedded single-carrier phase reference symbols.

In another aspect the present invention describes a method in an OFDM transmitter for embedding single-carrier phase reference symbols into an OFDM symbol. The method comprising the steps of allocating a phase reference frequency sub-band within the OFDM symbol for single-carrier phase reference symbols and embedding the single-carrier phase reference symbols into the phase reference frequency sub-band. The step of embedding may further comprise the additional steps of pre-processing the phase reference symbols in a single-carrier pre-processing unit arranged to provide pre-processed phase reference samples to an OFDM modulator and mapping data symbols to sub-carriers and the pre-processed phase reference samples onto a single-carrier signal in an OFDM modulator.

The above OFDM transmitter and method will provide a phase reference symbol format that can be used in an OFDM receiver to remedy, or at least alleviate, the impact of severe phase noise in an OFDM system.

BRIEF DESCRIPTION OF THE DRAWINGS

FIG. 4A shows schematically a phase reference symbol format according to the present invention in a time-frequency diagram, FIG. 4B shows schematically in a block diagram a transmitter solution according to the present invention.

The drawings are not necessarily to scale and the dimensions of certain features may have been exaggerated for the sake of clarity, emphasize is instead being placed upon illustrating the principle of the embodiments herein.

DETAILED DESCRIPTION

The following abbreviations are used throughout the text and the drawings:
ADC Analog-to-digital converter
DAC Digital-to-analog converter
DFT Discrete Fourier transform
FD Frequency-domain
IDFT Inverse discrete Fourier transform
LP Low-pass filter
OFDM Orthogonal frequency division multiplexing
P/S Parallel-to-serial converter
SC Single-carrier
S/P Serial-to-parallel converter
TD Time-domain Four embodiments of the present invention are described in detail below with reference to FIGS. 4-10. A first and a second embodiment of the present invention relate to an OFDM transmitter arranged for embedding single-carrier phase reference symbols into an OFDM symbol. A third and a fourth embodiment of the present invention relate to a method in an OFDM transmitter for embedding single-carrier phase reference symbols into an OFDM symbol. It should be noted that the scope of the present invention is not limited to the particular embodiments described herein, but only limited by the appended claims.

The IDFT 112 of the transmitter and the DFT 212 of the receiver are key components in an OFDM communication system. The N-point IDFT and DFT transforms are respectively given by $$s(n) = \frac{1}{\sqrt{N}} \sum_{k=0}^{N-1} S(k) \cdot e^{j2\pi k/N},$$

$$S(k) = \frac{1}{\sqrt{N}} \sum_{n=0}^{N-1} s(n) \cdot e^{-j2\pi k/N}.$$

In practice, the IDFT 112 and DFT 212 are efficiently implemented using an inverse fast Fourier transform (IFFT) and a fast Fourier transform (FFT). It should be noted that it is well-known to a person skilled in the art that the IDFTs and DFTs can be implemented using FFTs and IFFTs. The present invention is therefore not restricted to any specific algorithmic implementation of the DFT and IDFT.

Figure 10:
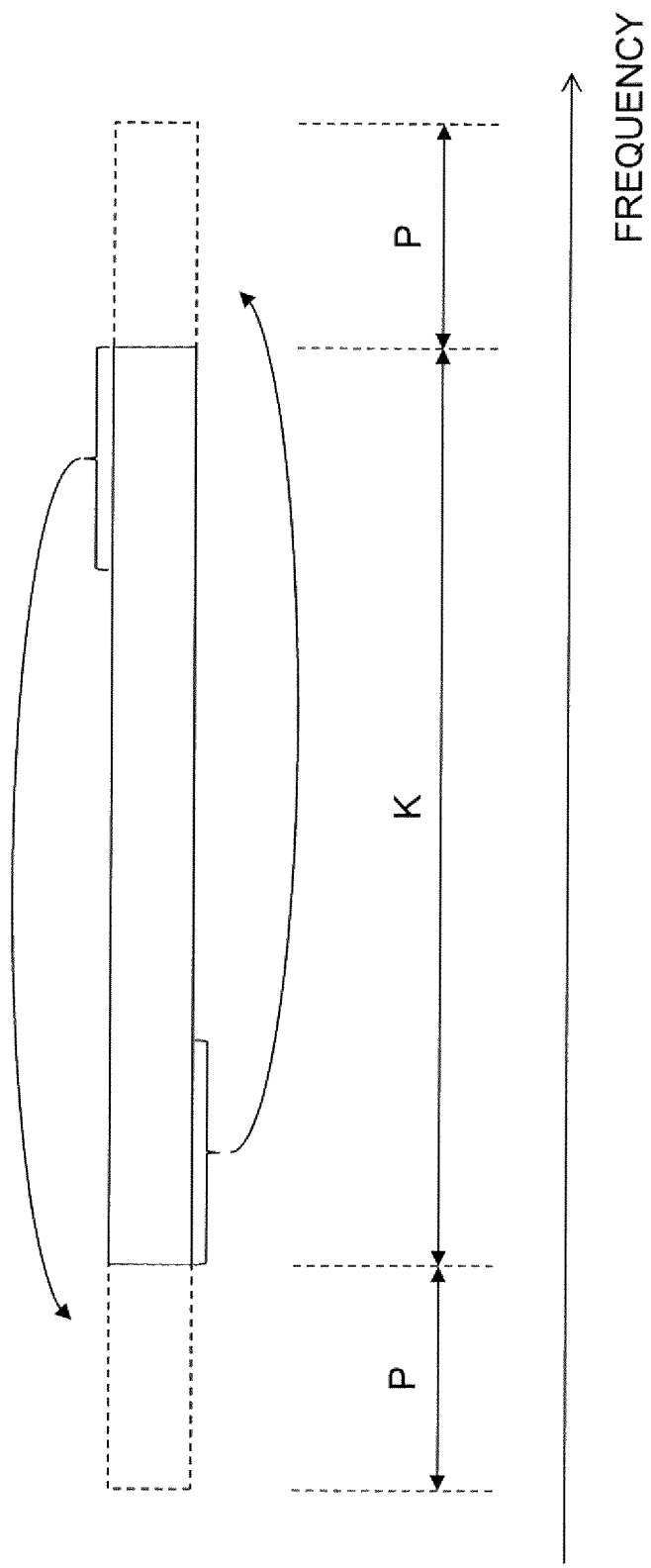
FIG. 10 shows schematically how the frequency-domain cyclic prefix and postfix may be obtained.

The main concept of the present invention is schematically illustrated in FIG. 4A, where a single-carrier modulated signal 471 carrying phase reference symbols 101 is embedded into a sub-band 470 of a regular OFDM symbol. As earlier mentioned, phase noise estimation is a relatively easy task in single-carrier communication systems but much more challenging in OFDM systems. The purpose of the embedded single-carrier phase reference symbols 101 is therefore to serve as a sequence of symbols for phase noise estimation within each OFDM symbol. As the effect of the phase noise is identical to all sub-carriers of the OFDM symbol, phase noise estimates obtained from the phase reference frequency sub-band 470 can be used for phase noise compensation for all data symbols 100. As illustrated in FIG. 4A, the phase reference frequency sub-band 470 occupies K+2P sub-carriers of the OFDM symbol, where K is the number phase reference symbols and 2P is the number of sub-carriers allocated for a prefix 472 and postfix 473 on each side of the single-carrier phase reference signal 471. The main purpose of the prefix and postfix is to prevent interference between data symbols and phase reference symbols. The prefix 472 and postfix 473 may be obtained by copying the first P and last P samples of the K-point DFT output, respectively. How to obtain the prefix and postfix is schematically illustrated in FIG. 10. Alternatively, the prefix 472 and postfix 473 may be empty. The remaining N−K−2P sub-carriers of the OFDM symbol are typically allocated for data symbols 100.

The first and the second embodiment of the present invention relate to an OFDM transmitter 400 arranged for embedding single-carrier phase reference symbols into an OFDM symbol. A block diagram of an OFDM transmitter solution common for both embodiments is schematically illustrated in FIG. 4B. Common elements in the two embodiments are an OFDM modulator 410, 510, 610 and a single-carrier pre-processing unit 420, 520, 620. The OFDM transmitter 400 may further comprise an LP & DAC unit 115 for low-pass filtering and digital-to-analog conversion, a TX block 116 for up-conversion to an RF signal and an antenna 117 for transmission.

The single-carrier pre-processing unit 420, 520, 620 has phase reference symbols 101 as input and is configured to provide pre-processed phase reference samples 430, 530, 630 to the OFDM modulator 410, 510, 610 as output. The OFDM modulator has data symbols 100 and pre-processed phase reference samples 430, 530, 630 as input and is configured to output an OFDM symbol with an embedded single-carrier phase reference signal 471 in the manner schematically illustrated in FIG. 4A. The pre-processed phase reference samples 430, 530, 630 are used by the OFDM modulator 410, 510, 610 for embedding a single-carrier signal comprising the phase reference symbols 101 into a phase reference sub-band of the OFDM symbol. In principle, there are only two possible ways of inputting the pre-processed phase reference samples 430, 530, 630 to the OFDM modulator; either before or after the IDFT 112. In frequency-domain, i.e. before the IDFT 112, the phase reference frequency sub-band 470 corresponds to K+2P inputs of the N-point IDFT. In time-domain, i.e. after the IDFT 112, the single-carrier signal will affect all N time-domain samples and therefore needs to be added to all of the N outputs 650', 650 of the N-point IDFT.

Figure 5:
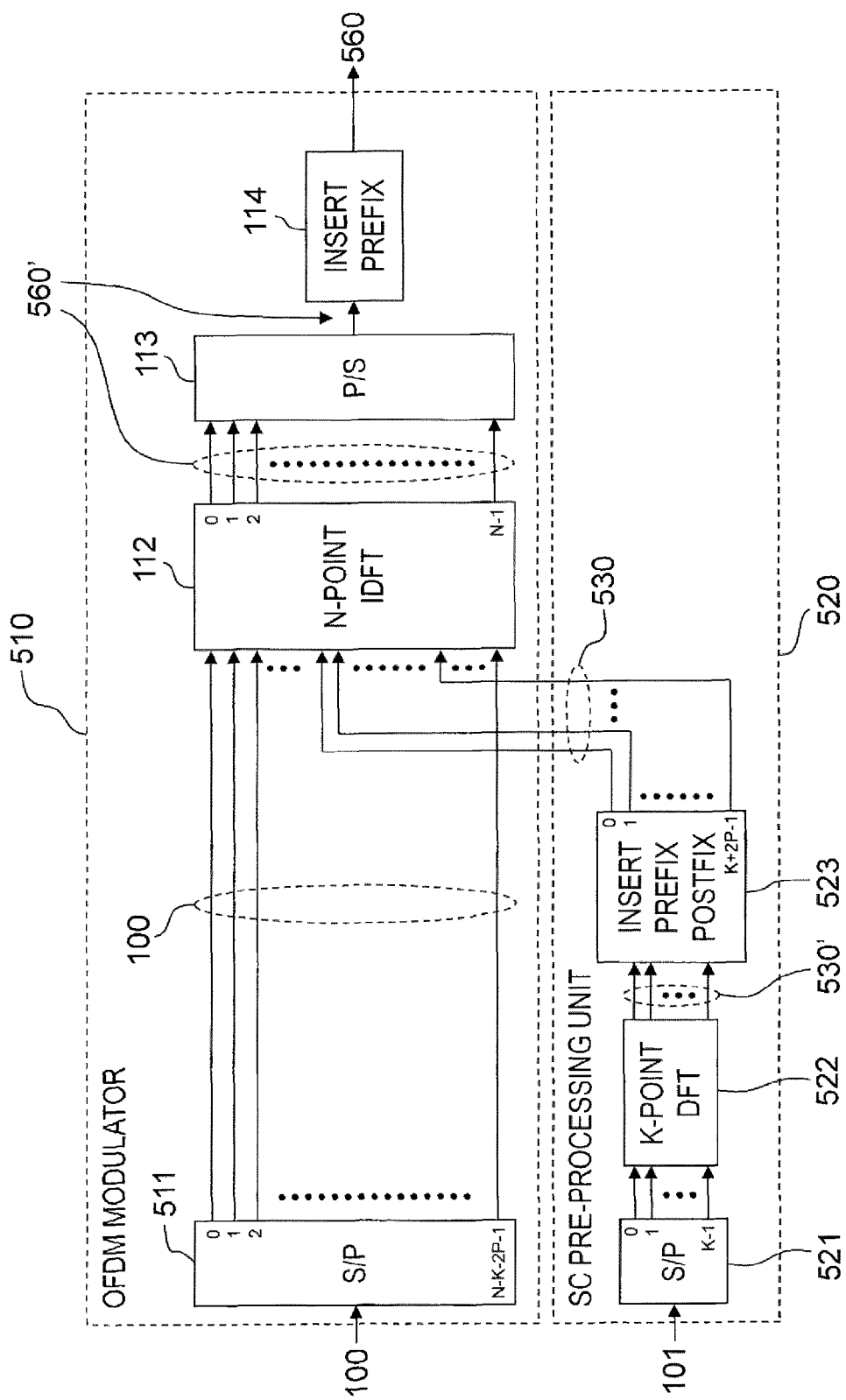
FIG. 5 shows schematically in a block diagram a transmitter corresponding to a first embodiment of the present invention.

In a first embodiment of the present invention, shown in FIG. 5, the phase reference symbols 101 are embedded into the OFDM symbol by inputting the pre-processed phase reference samples 530 before the IDFT 112 in the OFDM modulator 510. This can be achieved by first converting the phase reference symbols 101 to frequency-domain in a DFT. Hence, for the first embodiment of the invention, the pre-processed phase reference samples 530 are frequency-domain pre-processed phase reference samples 530.

The frequency-domain pre-processed phase reference samples 530 are obtained by inputting K phase reference symbols to the single-carrier pre-processing unit 520. The phase reference symbols 101 are parallelized in an S/P unit 521 and then precoded by a K-point DFT 522 whose frequency-domain output 530' is cyclically extended in an insert prefix postfix unit 523 by assigning a prefix of P sub-carriers and a postfix of P sub-carriers to the K DFT-precoded frequency-domain samples 530'. The prefix is obtained by taking the last P samples of the K-point DFT output and the postfix by taking the first P samples of the K-point DFT, as schematically illustrated in FIG. 10. Alternatively, the prefix and postfix may be empty. The outputs of the insert prefix postfix unit 523 are the frequency-domain pre-processed phase reference samples 530.

Figure 11:
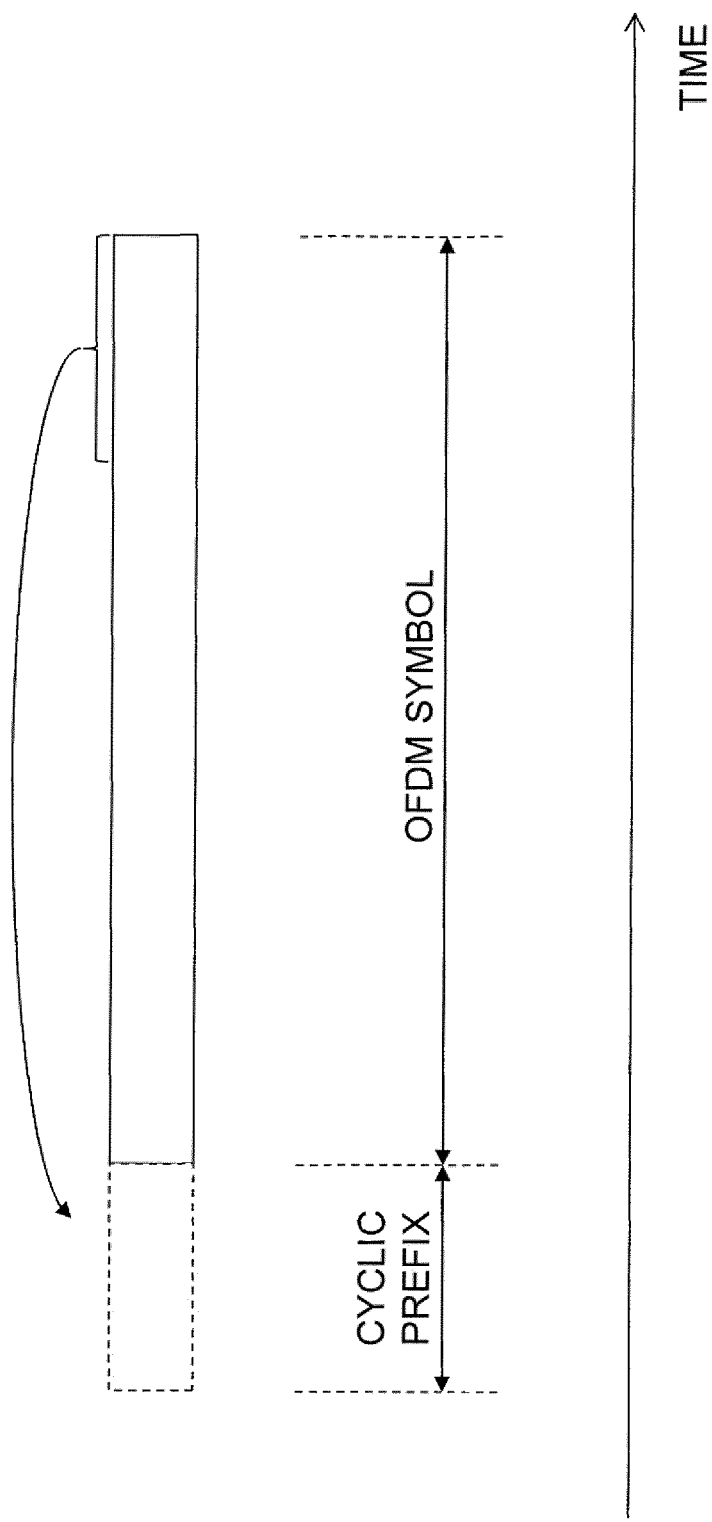
FIG. 11 shows schematically how the time-domain cyclic prefix may be obtained.

The OFDM modulator 510 has data symbols 100 and frequency-domain pre-processed phase reference samples 530 as input. The frequency-domain pre-processed phase reference samples 530 are fed to K+2P adjacent inputs of the N-point IDFT 112 and the remaining N−K−2P inputs of the N-Point IDFT 112 are typically allocated for data symbols 100, where the data symbols 100 have first been parallelized in an S/P block 511 before being fed to the N-point IDFT 112. It should be noted that adjacent inputs here refers to adjacency in frequency-domain, i.e. inputs corresponding to adjacent OFDM sub-carriers. The outputs of the N-Point IDFT 112 are serialized in a P/S block 113 before a time-domain cyclic prefix is inserted in an insert prefix unit 114 to obtain the OFDM symbol 560 with embedded single-carrier phase reference symbols. The time domain cyclic prefix is obtained by taking the last samples of the N-point IDFT output and inserting them in front of the OFDM symbol, as schematically illustrated in FIG. 11. Note that the outputs of the N-Point IDFT 112 represent the OFDM symbol 560' with embedded single-carrier phase reference symbols but without cyclic prefix inserted.

Figure 1:
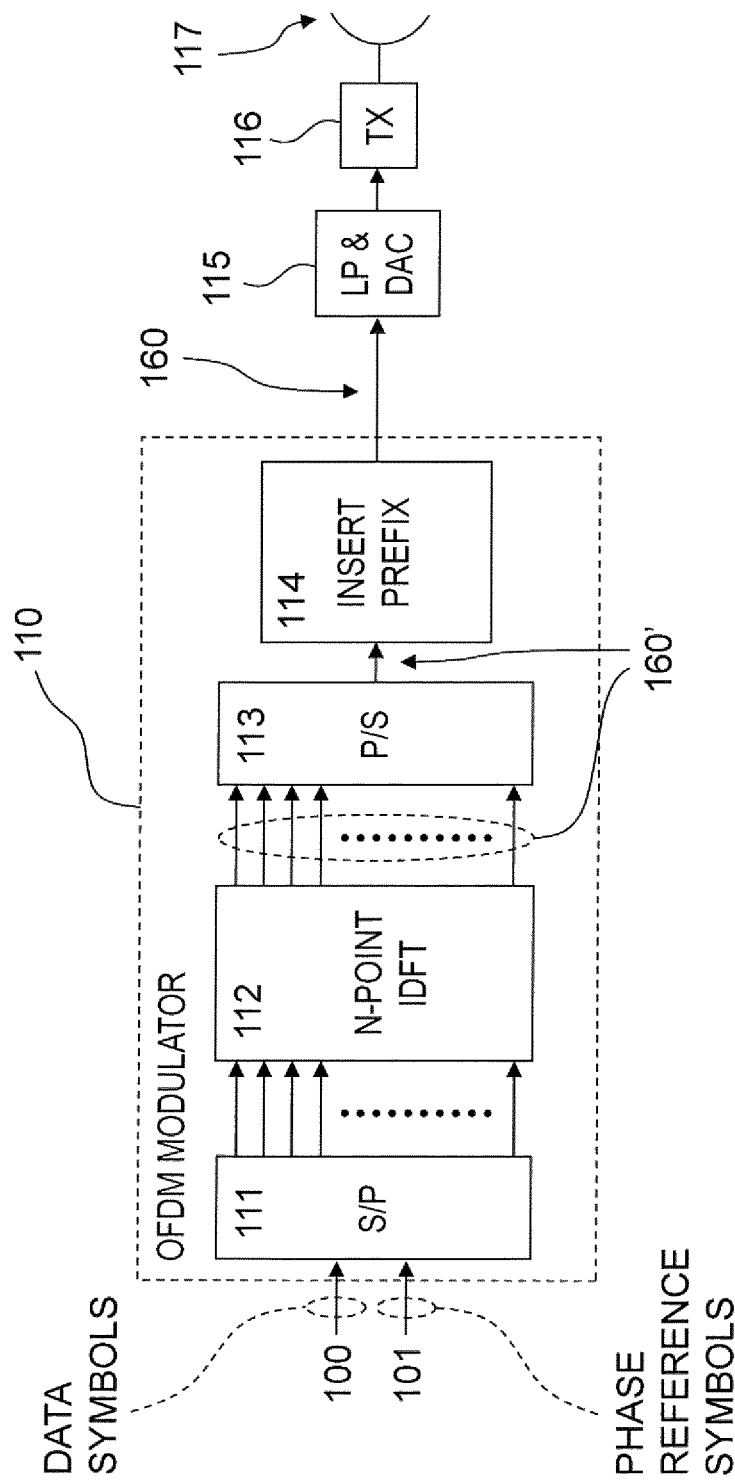
FIG. 1 shows schematically in a block diagram a conventional OFDM transmitter.
Figure 2:
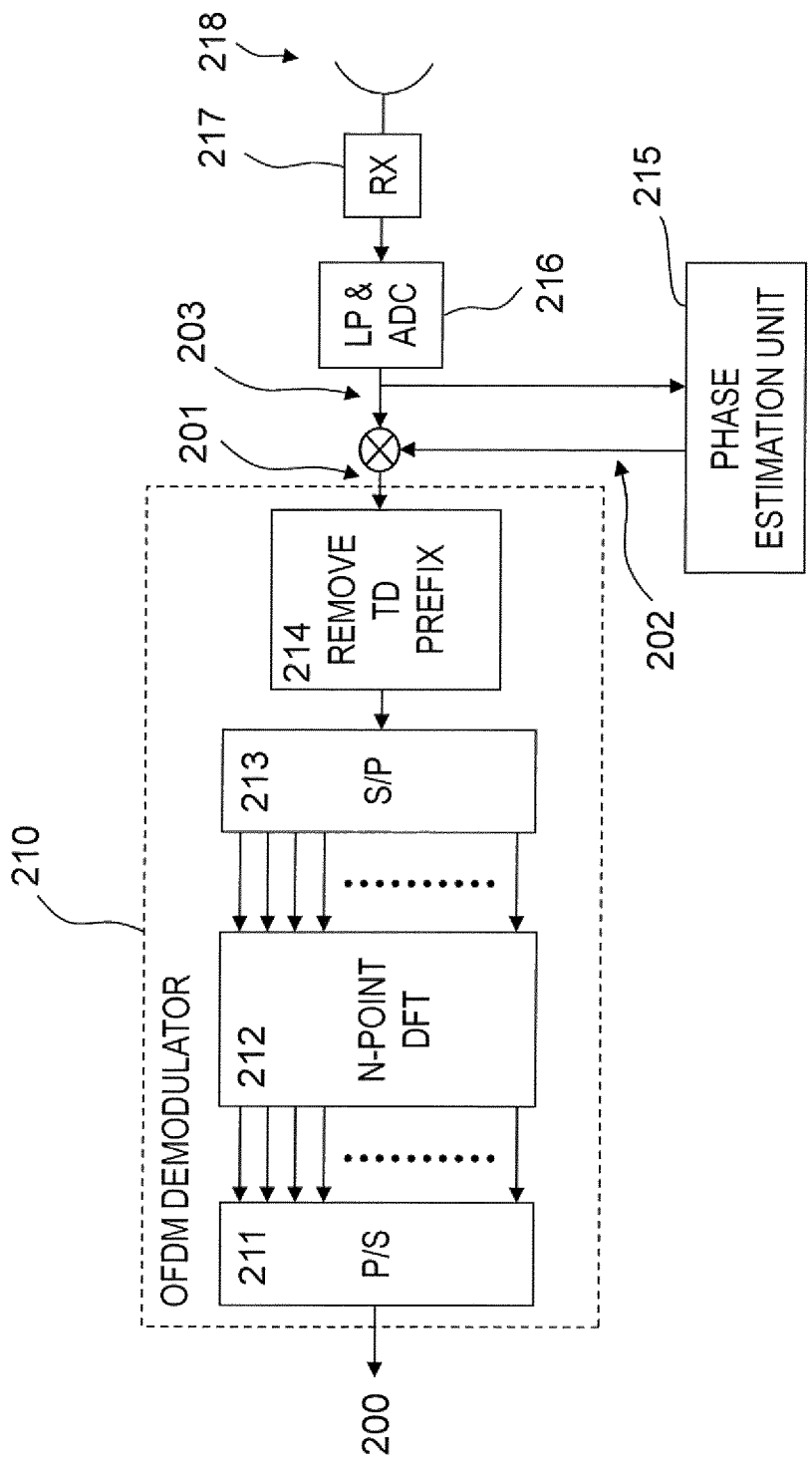
FIG. 2 shows schematically in a block diagram a conventional OFDM receiver with phase estimation unit and phase compensation unit.
Figures 3A, 3B:
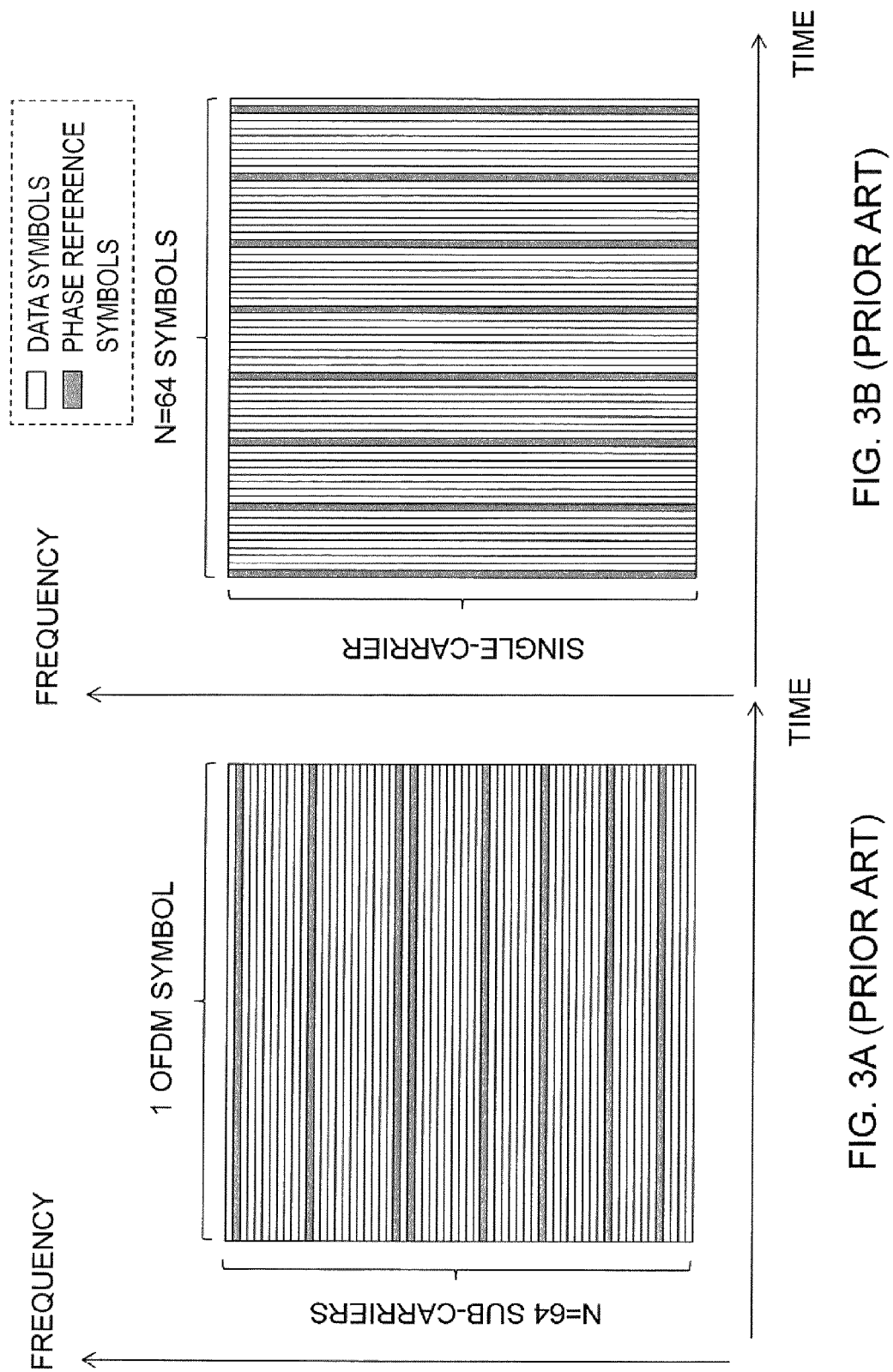
FIG. 3A shows schematically a conventional OFDM phase reference symbol format in a time-frequency diagram.
FIG. 3B shows schematically a conventional single-carrier phase reference symbol format in a time-frequency diagram.
Figure 7:
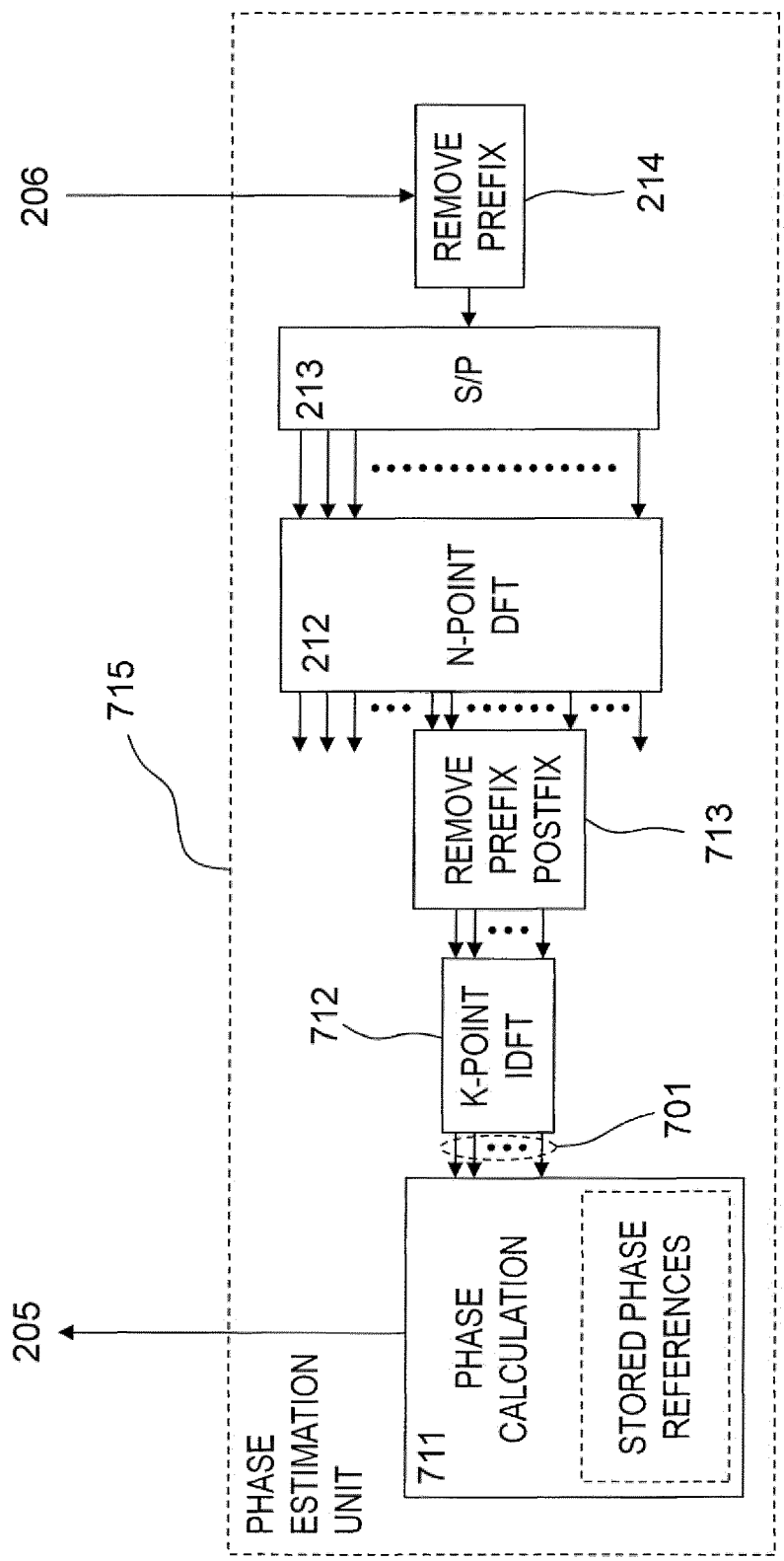
FIG. 7 shows schematically in a block diagram a phase estimation unit of the receiver of FIG. 2, now configured according to the first embodiment of the present invention.

FIG. 7 illustrates an implementation of the phase estimation unit 715 of the receiver of FIG. 2 adapted to be used with the first embodiment of the invention. The phase estimation unit extracts the phase reference sub-band 470 and converts it to the time-domain, where phase noise estimation is performed. Input to the phase estimation unit is the received signal 206 and output is a phase compensation signal 205. The time-domain cyclic prefix of the received signal is first removed in a remove prefix unit 214 whose output is parallelized in an S/P block 213 before conversion to frequency-domain in an N-point DFT 212.

The phase reference sub-band is extracted by inputting the K+2P frequency samples corresponding to the phase reference sub-band into a remove prefix postfix unit 713 and passing on the following output to a K-point IDFT 712 which converts the K frequency-domain pre-processed phase reference samples to K time-domain received phase reference symbols 701. The received phase reference symbols are used as input to a phase calculation unit 711, which computes the phase compensation signal 205 by calculating the difference between the received phase reference symbols (701) and the transmitted phase reference symbols 101 which are known to the phase calculation unit 711. After multiplying the received signal with the phase compensation signal, the resulting phase compensated signal 201 can be demodulated in the conventional OFDM receiver of FIG. 2.

Figure 6:
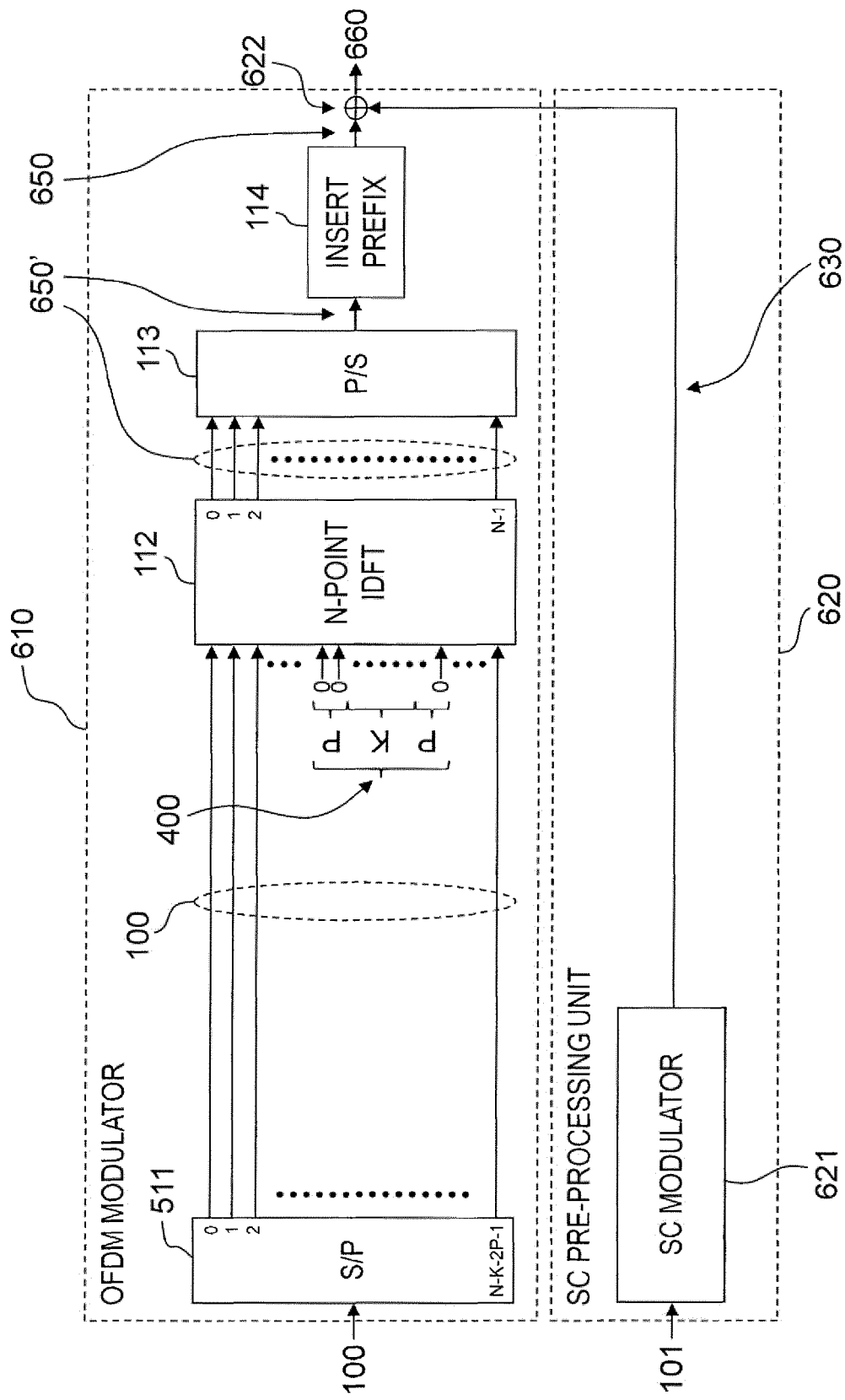
FIG. 6 shows schematically in a block diagram a transmitter corresponding to a second embodiment of the present invention.

In a second embodiment of the present invention, shown in FIG. 6, the phase reference symbols 101 are embedded into the OFDM symbol by inputting the pre-processed phase reference samples 630 after the IDFT 112 in the OFDM modulator 610. Hence, for the second embodiment of the invention, the output of the single-carrier pre-processing unit 620 is time-domain pre-processed phase reference samples 630.

The time-domain pre-processed phase reference samples 630 are obtained by inputting K phase reference symbols 101 to the single-carrier pre-processing unit 520, where the single-carrier pre-processing unit comprises a single-carrier (SC) modulator 621. The SC modulator 621 being arranged to map the K phase reference symbols 101 to N time-domain pre-processed phase reference samples 630 that represents the single-carrier signal 471.

The OFDM modulator 610 has data symbols 100 and time-domain pre-processed phase reference samples 630 as input and is configured such that K+2P adjacent inputs of the N-point IDFT 112 are allocated for the phase reference frequency sub-band 470 by having the input 0. Again, it should be noted that adjacent inputs refers to adjacency in frequency-domain, i.e. inputs corresponding to adjacent OFDM sub-carriers. The remaining N−K−2P inputs of the N-Point IDFT 112 are typically allocated for data symbols, where the data symbols 100 have first been parallelized in an S/P block 511 before being fed to the N-point IDFT 112. The outputs of the N-Point IDFT 112 are serialized in a P/S block 113 before a time-domain cyclic prefix is added in insert prefix unit 114 to obtain an OFDM symbol with empty phase reference sub-band 470. To embed the time-domain pre-processed phase reference samples 630 into the phase reference frequency sub-band 470, the time-domain pre-processed phase reference samples 630 are added to the N-point IDFT outputs 650'. It should be noted that the N-point IDFT outputs are the time-domain OFDM samples 650' with a frequency sub-band 470 allocated for phase reference symbols. It should also be noted that the time-domain pre-processed phase reference samples 630 can be added at any point after the N-point IDFT 112. Hence, the addition can be performed before the P/S block 113, after the P/S block or after the insert prefix block 114. Alternatively, the addition can be performed after DAC.

Figure 8:
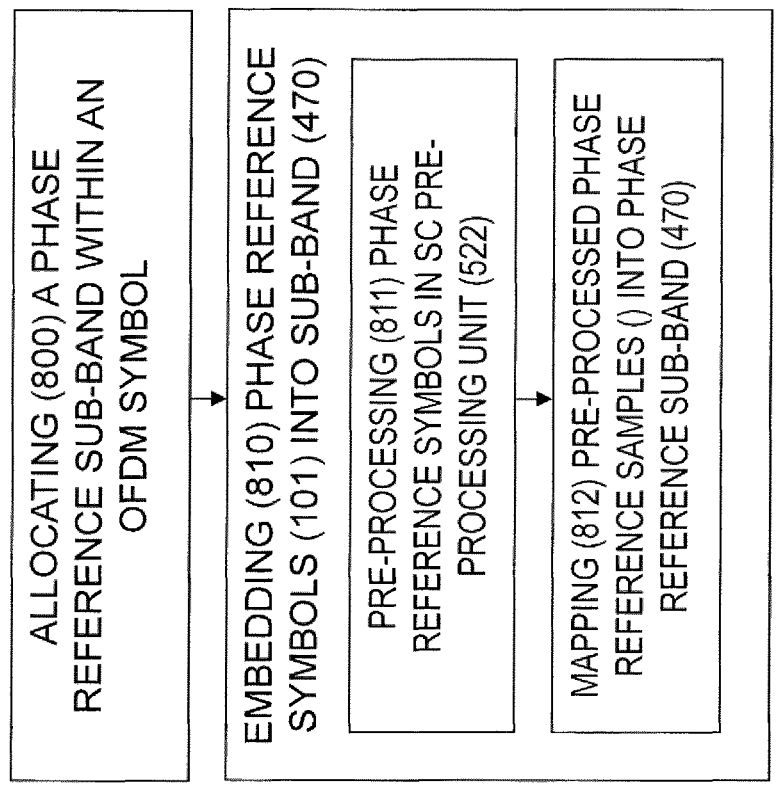
FIG. 8 shows schematically in a flowchart a method for embedding phase reference symbols into an OFDM symbol according to the present invention.

The third and the fourth embodiment of the present invention relates to a method in an OFDM transmitter 400 for embedding single-carrier phase reference symbols into an OFDM symbol. Common steps in the two embodiments are the steps of allocating 800 a phase reference sub-band 470 within the OFDM symbol for single-carrier phase reference symbols, and embedding 810 the single-carrier phase reference symbols into the phase reference frequency sub-band 470. Common for the two embodiments is also that the step of embedding 810 may further comprise pre-processing 811 the phase reference symbols 101 in a single-carrier pre-processing unit 420, 520, 620 configured to provide pre-processed phase reference samples 430, 530, 630 to the OFDM modulator 410, 510, 610, and mapping 812 data symbols 100 onto sub-carriers and the pre-processed phase reference samples 430, 530, 630 onto a single-carrier phase reference signal in an OFDM modulator 410, 510, 610. A flowchart illustrating the common steps of the method of the third and fourth embodiments is shown in FIG. 8.

The third embodiment of the present invention comprises the common steps described above, wherein the pre-processed phase reference samples are the frequency-domain pre-processed phase reference samples 530 obtained by inputting K phase reference symbols 101 to a K-point DFT 522 and by inserting P prefix 472 and P postfix samples 473 to the K-point DFT output, and the step of mapping 812 comprises inputting the DFT-precoded frequency-domain samples 530 to K+2P adjacent inputs of an N-point IDFT 112.

The fourth embodiment of the present invention comprises the common steps described above, wherein the pre-processed phase reference samples are the time-domain samples 630 obtained by inputting K phase reference symbols 101 to a single-carrier modulator 621, the step of allocating 800 comprises inputting zeros to K+2P adjacent inputs of an N-point IDFT 112 to obtain an OFDM symbol with allocated sub-band, and the step of mapping 812 comprises adding the time-domain pre-processed phase reference samples 630 and the OFDM symbol 650', 660 with allocated sub-band to obtain an OFDM symbol with embedded single-carrier phase reference symbols 660.

The four embodiments described above combine the advantages of OFDM for data transmission over frequency selective channels with the advantage of a single-carrier signal for phase noise tracking. The present invention allows for a flexible way of allocating the phase reference sub-band, as well as the rate of the phase reference symbols. Moreover, the single-carrier reference symbols ensures the possibility of using equal energy phase reference symbols (e.g. phase shift keying); an often desired property in phase noise estimation.

Practical aspects of the present invention that needs to be considered are the phase reference symbol bandwidth selection and sub-band scheduling. The phase reference symbol bandwidth, i.e. the time-domain resolution of the reference symbols, is determined by the number of allocated sub-carriers K, Sampling rate $F_s$, IDFT/DFT size N, and cyclic prefix length $N_g$ as $$T_{RS} = \frac{N + N_g}{KF_s}.$$

Thus, by increasing the number of sub-carriers K allocated to phase reference symbols 101, the time-domain resolution of the phase noise estimate can be increased. The bandwidth of the phase reference sub-band 470 should preferably be high enough for the resulting time-domain symbols to capture the change in phase noise during the OFDM symbol. The bandwidth of the phase reference sub-band 470 is preferably narrow enough to be subject to essentially frequency flat fading over the radio channel and thus avoiding inter-reference symbol interference. Moreover, to avoid interference from data symbols, and to preserve the cyclic property of the K-point DFT 522, the number of sub-carriers P allocated to the prefix 472 and postfix 473 should preferably be high enough to capture most of the energy in the phase-noise process.

Regarding sub-band scheduling, the phase reference sub-band 470 is preferably positioned so that enough reference symbol energy is received, i.e. deep fading dips on the radio channel are avoided. In systems with low Doppler spread, such as point-to-point and multi-point-to-point backhaul systems, this can be accomplished by sending an indicator from the receiver back to the transmitter containing the information of which sub-band that currently is preferred. By adjusting the number of phase reference symbols K and which frequency indices of the N-point IDFT 112 that carry the phase reference symbols, it is possible to adjust in a flexible way both the bandwidth and the position of the phase reference sub-band. In systems with high Doppler spread, feedback from the transmitter to the receiver might be a challenge due to the inherent latency between transmitter and receiver. In this case, to gain diversity, multiple phase reference sub-bands can be distributed over the total systems bandwidth at the cost of increased computational complexity and higher reference symbol overhead.

It should be noted that the present invention may further comprise the cases when the phase reference symbols 101 are either a-priori known reference symbols (i.e. pilot symbols) or data symbols that are detected and used as known reference symbol (i.e. decision feedback). In a product implementation, it is likely that a combination of pilot symbols and data symbols are used as phase reference symbols. Moreover, channel coding, e.g. a block code, can be used on the single-carrier signal to reduce the number of detection feedback errors.

It should be noted that the S/P 111, 213, 511, 521 and P/S 113, 211 blocks are simply serial-to-parallel and parallel-to-serial conversions. Hence, the inputs of each S/P 111, 213, 511, 521 and P/S 113, 211 block are the same as its outputs. Note also that some of the S/P blocks 111, 311A, 311B and P/S 211 blocks may be omitted if data symbols 100 and phase reference symbols 101 are inputted and outputted in parallel.

It should also be noted that the insert prefix postfix unit 523 and insert prefix unit 114 are simply inserting a prefix (and a postfix) as illustrated in FIGS. 10-11, respectively. Hence, the input 160', 560', 650' of the prefix unit 114 is fully comprised as an interval of the output 160, 560, 650 of the prefix unit. Hence, any processing on the N-point IDFT outputs can be performed either before or after the insert prefix unit 114.

Figure 9:
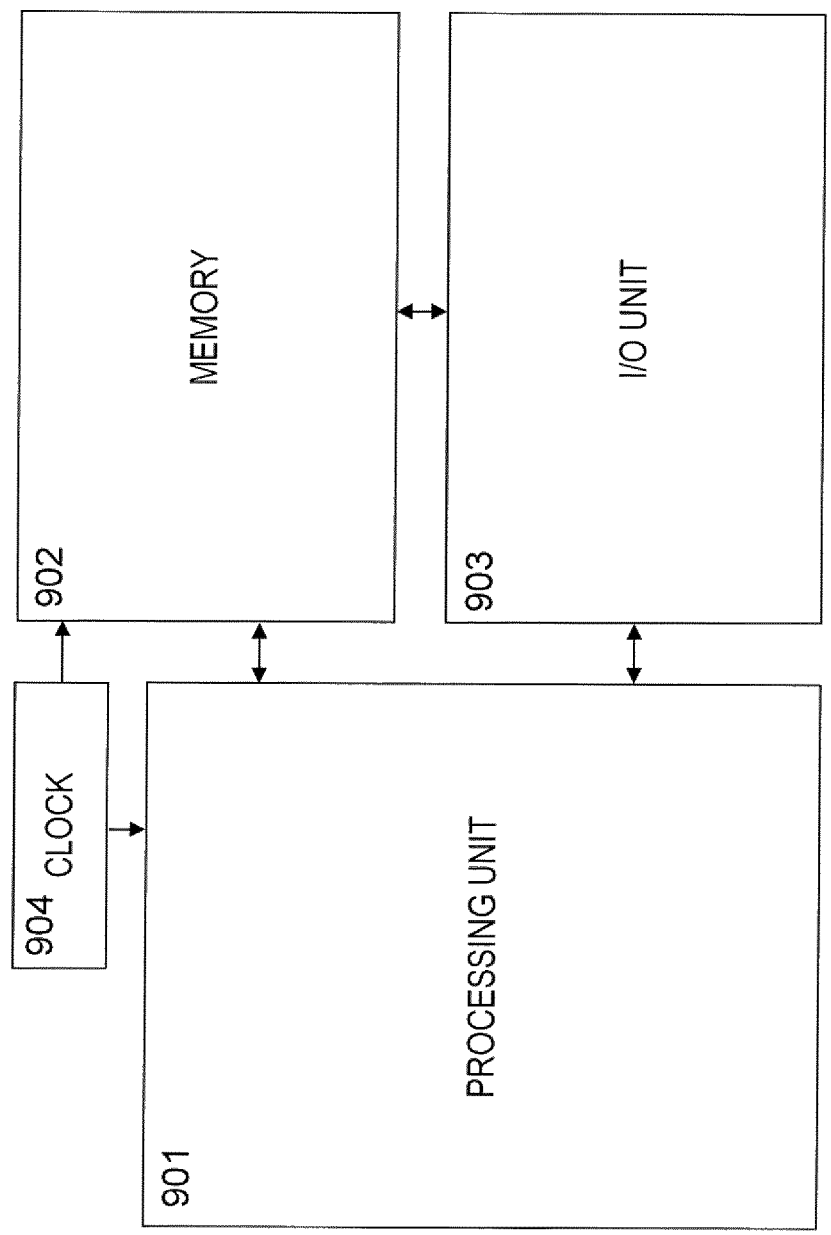
FIG. 9 shows schematically a hardware implementation of the present invention.

FIG. 9 illustrates another aspect of the present invention, where the OFDM transmitter 510, 610 and single-carrier pre-processing unit 520, 620 may be implemented as a processing unit 801, a memory 802, input/output, I/O, unit 803 and a clock 804. The processing unit 801, the memory 802 and the I/O unit 803 may be interconnected. The processing unit 801 may comprise a central processing unit (CPU), digital signal processor (DSP), multiprocessor system, programmable logic, field programmable gate array (FPGA) or application specific integrated circuit (ASIC) or any other type of logic. The memory 802 may comprise random access memory (RAM), read only memory (ROM) or any other type of memory. The I/O unit 803 may comprise circuitry for controlling I/O devices and performing signal conversions on I/O data, e.g. ADC and DAC of the received and transmitted signal, respectively.

The embodiments are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the method may, without departing from the embodiments herein, be performed in another order than the order in which they appear.

The invention claimed is:

1. An orthogonal frequency division multiplexer (OFDM) transmitter arranged to embed single-carrier phase reference symbols into an OFDM symbol, the OFDM transmitter comprising:
    a single-carrier pre-processing unit arranged to receive phase reference symbols as input and provide pre-processed phase reference samples as output, and
    an OFDM modulator arranged to receive data symbols and pre-processed phase reference samples as input and map the data symbols to sub-carriers and use the pre-processed phase reference samples to embed a plurality of single-carrier phase reference symbols into a frequency sub-band of the OFDM symbol.

2. The OFDM transmitter according to claim 1, wherein the pre-processed phase reference samples are frequency-domain pre-processed phase reference samples and the single-carrier pre-processing unit comprises a K-point discrete Fourier discrete Fourier transformation (DFT) unit arranged to receive K phase reference symbols as input and provide K DFT-precoded frequency domain samples as output, and an insert prefix postfix unit arranged to insert P prefix and P postfix samples to the DFT-precoded frequency domain samples to obtain the frequency-domain pre-processed phase reference samples, and
    the OFDM modulator comprises an N-point inverse discrete Fourier transformation (IDFT) unit arranged to receive the data symbols and the frequency-domain pre-processed phase reference samples as input, and map the data symbols onto sub-carriers and the frequency-domain pre-processed phase reference samples onto a single-carrier signal by inputting the frequency-domain pre-processed phase reference samples to K+2P adjacent inputs of the N-point IDFT unit to obtain the OFDM symbol with the embedded plurality of single-carrier phase reference symbols from the N-point IDFT output.

3. The OFDM transmitter according to claim 1, wherein the pre-processed phase reference samples are time-domain pre-processed phase reference samples and the single-carrier pre-processing unit comprises a single-carrier modulator arranged to receive K phase reference symbols as input and provide time-domain pre-processed phase reference samples as output, and
    the OFDM modulator comprises an N-point inverse discrete Fourier transformation (IDFT) unit arranged to receive data symbols as input, map the data symbols onto sub-carriers and allocate a phase reference frequency sub-band by inputting 0 to K+2P adjacent inputs of the N-point IDFT to obtain time-domain OFDM samples from the N-point IDFT output, and an adder arranged to add the time-domain OFDM samples and the time-domain pre-processed phase reference samples to obtain an OFDM symbol with the embedded plurality of single-carrier phase reference symbols.

4. The OFDM transmitter according to claim 1, wherein the phase reference symbols are predetermined pilot symbols.

5. The OFDM transmitter according to claim 1, wherein the phase reference symbols are data-carrying phase reference symbols.

6. The OFDM transmitter according to claim 1, wherein the phase reference symbols have equal energy.

7. A method in an orthogonal frequency division multiplexer (OFDM) transmitter for embedding a plurality of single-carrier phase reference symbols into an OFDM symbol, the method comprising:
   allocating a phase reference frequency sub-band within the OFDM symbol for the plurality of single-carrier phase reference symbols,
   embedding the plurality of single-carrier phase reference symbols into the phase reference frequency sub-band to obtain an OFDM symbol with the embedded plurality of single-carrier phase reference symbols.

8. The method of claim 7, wherein the step of embedding further comprises:
   pre-processing the plurality of phase reference symbols in a single-carrier pre-processing unit arranged to provide pre-processed phase reference samples to an OFDM modulator, and
   mapping data symbols to sub-carriers and the pre-processed phase reference samples onto a single-carrier signal in an OFDM modulator.

9. The method of claim 8, wherein the pre-processed phase reference samples are frequency-domain pre-processed phase reference samples obtained by inputting K phase reference symbols to a K-point DFT and by inserting P prefix and P postfix samples to the K-point DFT output, and the step of mapping comprises inputting the frequency-domain pre-processed phase reference samples to K+2P adjacent inputs of an N-point inverse discrete Fourier transformation (IDFT).

10. The method of claim 8, wherein the pre-processed phase reference samples are time-domain pre-processed phase reference samples and obtained by inputting K phase reference symbols to a single-carrier modulator, the step of allocating comprises inputting zeros to K+2P adjacent inputs of an N-point inverse discrete Fourier transformation (IDFT) to obtain time-domain OFDM samples from the N-point IDFT output, and the step of mapping comprises adding the time-domain OFDM samples with the time-domain pre-processed phase reference samples to obtain the OFDM symbol with the embedded plurality of single-carrier phase reference symbols.

11. The method of claim 7, wherein the plurality of phase reference symbols are predetermined pilot symbols.

12. The method of claim 7, wherein the plurality of phase reference symbols are data-carrying phase reference symbols.

13. The method of claim 7, wherein the plurality of phase reference symbols have equal energy.

* * * * *

UNITED STATES PATENT AND TRADEMARK OFFICE
CERTIFICATE OF CORRECTION

PATENT NO. : 9,634,876 B2
APPLICATION NO. : 14/769816
DATED : April 25, 2017
INVENTOR(S) : Persson et al.

It is certified that error appears in the above-identified patent and that said Letters Patent is hereby corrected as shown below:

On the Title Page

In Item (72), under "Inventors", in Column 1, Line 2, delete "Molnlycke" and insert -- Mölnlycke --, therefor.

In the Drawings

In Fig. 8, Sheet 8 of 11, delete " 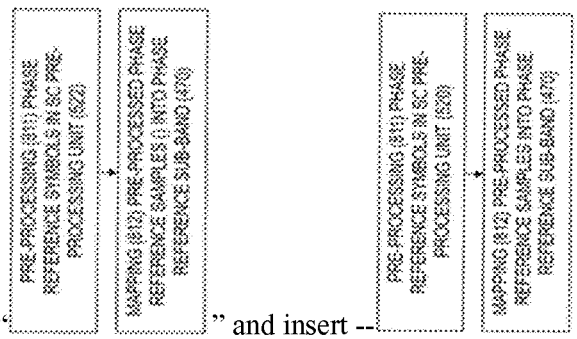 " and insert -- --, therefor.

In Fig. 9, Sheet 9 of 11, delete Tag "904" and insert Tag -- 804 --, therefor.

In Fig. 9, Sheet 9 of 11, delete Tag "902" and insert Tag -- 802 --, therefor.

In Fig. 9, Sheet 9 of 11, delete Tag "901" and insert Tag -- 801 --, therefor.

In Fig. 9, Sheet 9 of 11, delete Tag "903" and insert Tag -- 803 --, therefor.

In the Specification

In Column 1, Line 20, delete "inter-sub-carrier" and insert -- inter carrier --, therefor.

Signed and Sealed this
Seventeenth Day of April, 2018

Andrei Iancu
*Director of the United States Patent and Trademark Office*

CERTIFICATE OF CORRECTION (continued)
U.S. Pat. No. 9,634,876 B2

In Column 6, Line 29, delete "frequency-domain samples 300'" and insert -- frequency-domain samples 300 --, therefor.

In Column 7, Line 11, delete "(701)" and insert -- 701 --, therefor.

In the Claims

In Column 10, Line 17, in Claim 1, delete "multiplexer" and insert -- multiplexing --, therefor.

In Column 11, Line 1, in Claim 3, delete "time-domain" and insert -- time domain --, therefor.

In Column 11, Lines 12-13, in Claim 7, delete "multiplexer" and insert -- multiplexing --, therefor.